Jan. 15, 1935. J. E. EUTH 1,988,195
WEB ALIGNING DEVICE
Filed Feb. 6, 1930 3 Sheets-Sheet 1
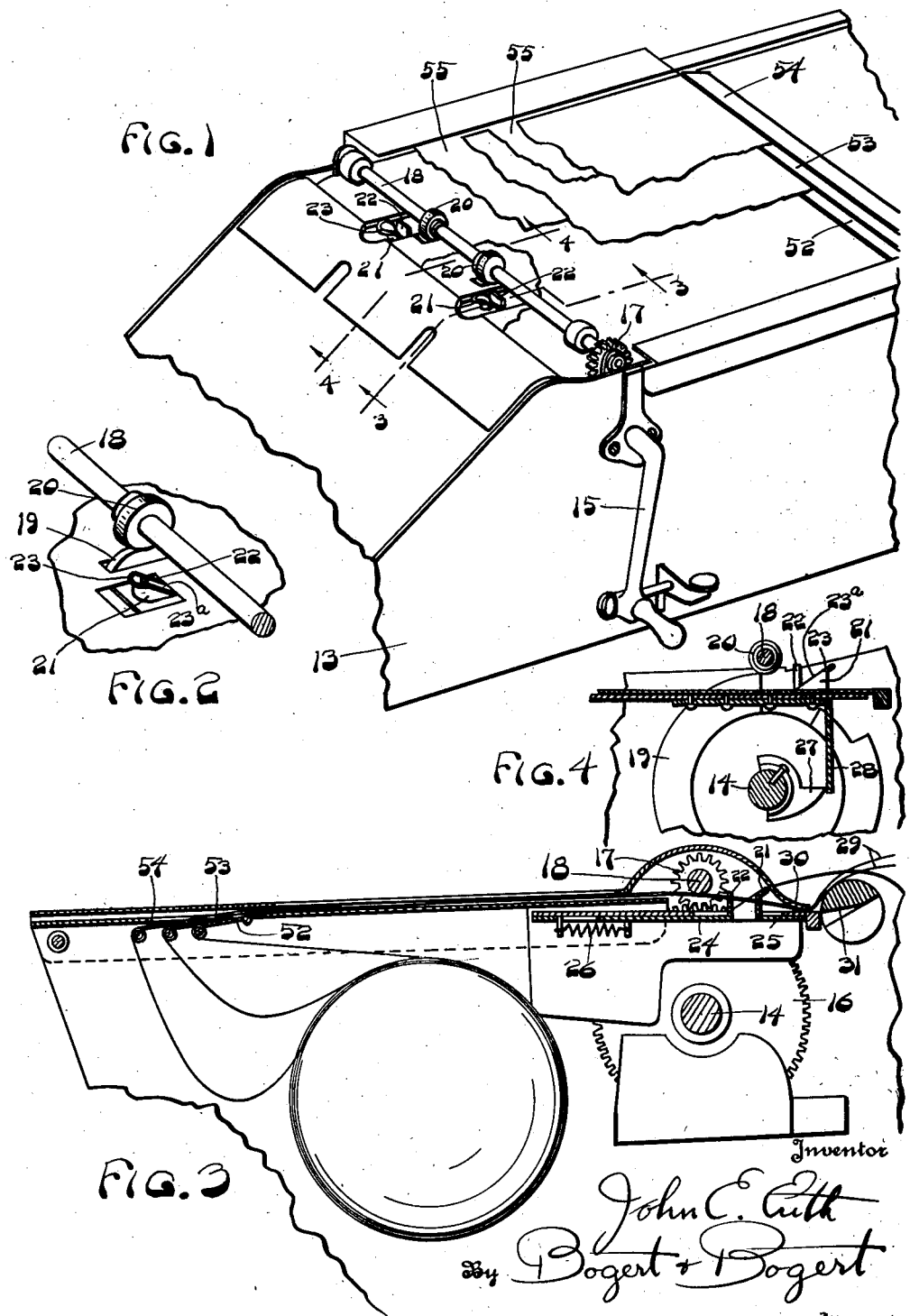

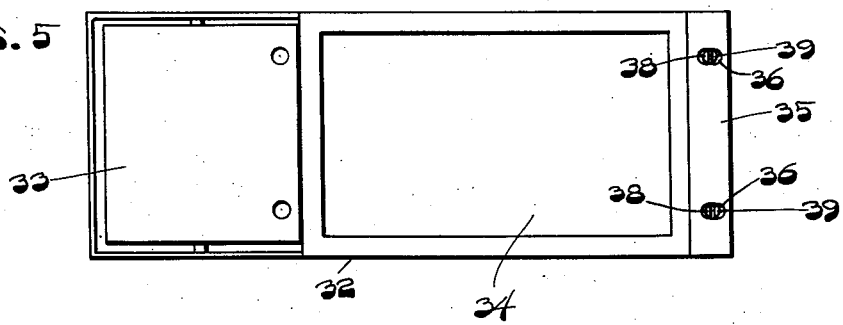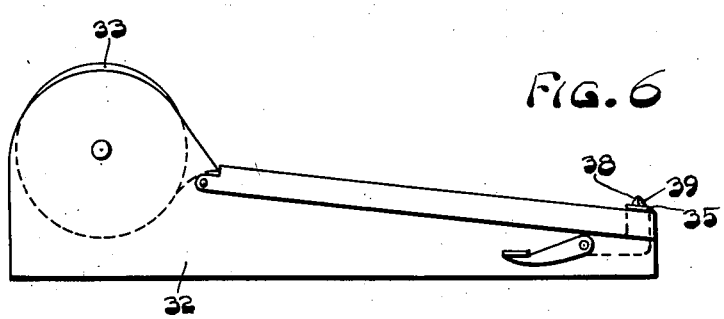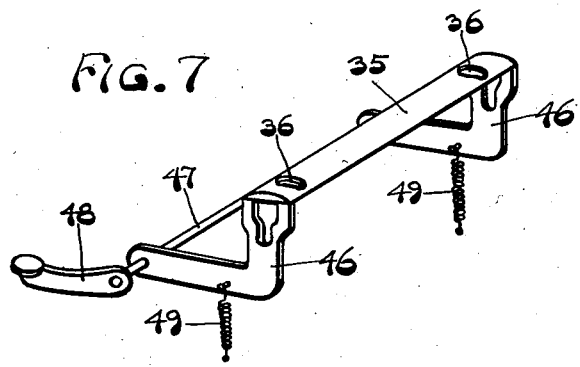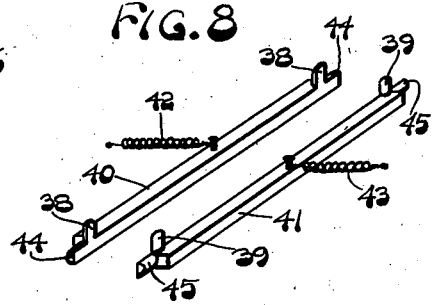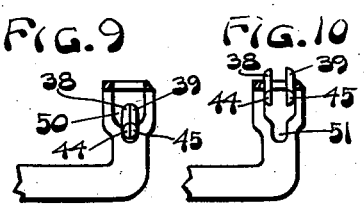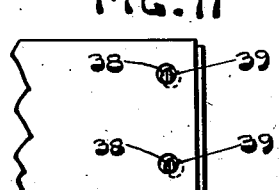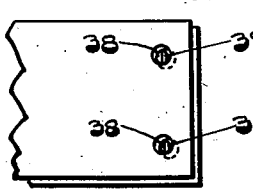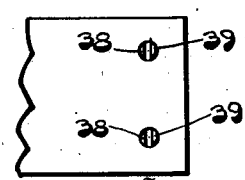

Jan. 15, 1935.  J. E. EUTH  1,988,195
WEB ALIGNING DEVICE
Filed Feb. 6, 1930  3 Sheets-Sheet 3
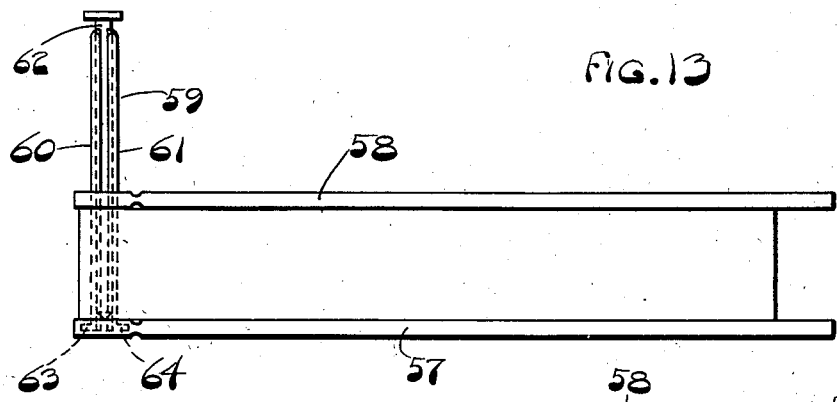
FIG.13
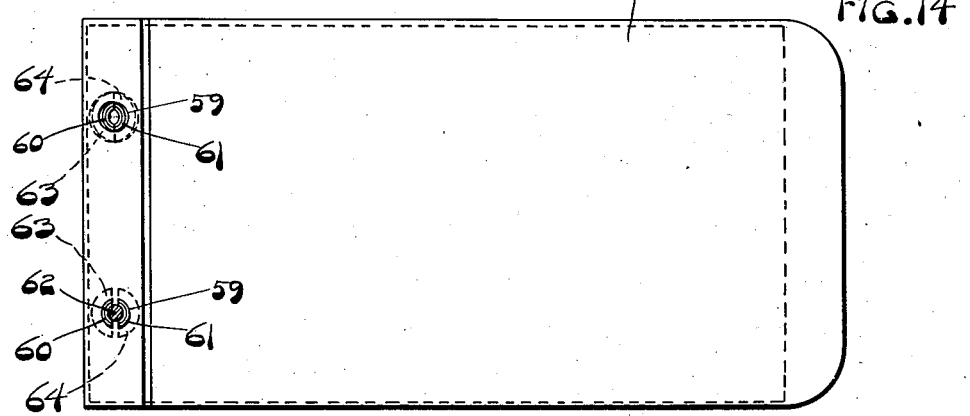
FIG.14
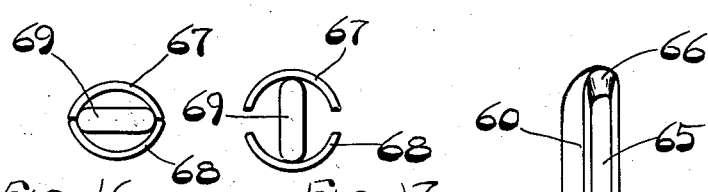
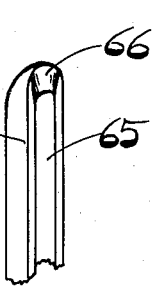
FIG.16  FIG.17  FIG.15
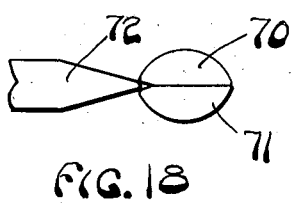
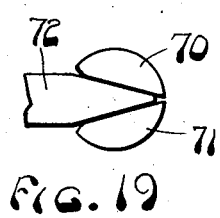
FIG.18  FIG.19
Inventor
John E. Euth
By Bogert & Bogert
Attorneys Patented Jan. 15, 1935

1,988,195

UNITED STATES PATENT OFFICE 1,988,195

WEB ALIGNING DEVICE

John E. Euth, Cincinnati, Ohio, assignor to The United Autographic Register Company, Chicago, Ill., a corporation of Illinois Application February 6, 1930, Serial No. 426,308

REISSUED

4 Claims. (Cl. 282—21)

In this invention applicant has produced a radical departure from such alignment devices as are usually employed to secure correct alignment of two or more form printed webs or sheets such as are used in autographic registers and other devices necessitating the use of two or more webs of stationery one or more of which contains forms which are printed in duplicate, triplicate and the like for receiving hand or type written records, orders, sales or other transactions.

An object of the invention is to simplify the operation of and mechanism for obtaining perfectly superposed registration of the forms printed on the two or more sheets or webs, so that notations made on the uppermost printed form will appear in identically the same relative position on the remaining superposed forms.

A further object is to produce an alignment mechanism in which longitudinal as well as lateral individual shifting of the superposed form-printed webs forward, backward or to either side is secured either by suitable manipulations upon the webs through the apertures or punched holes therein.

These and other objects are attained in the alignment device described in the following specification and illustrated in the accompanying drawings in which:

Fig. 1 is a fragmental perspective view of a portion of a register equipped with an alignment device embodying my invention.

Fig. 2 is a somewhat enlarged fragmental perspective view showing part of the device disclosed in Fig. 1, but with the elements in different positions.

Fig. 3 is a somewhat enlarged fragmental longitudinal section of the register shown in Fig. 1 and taken on the line 3—3 thereof.

Fig. 4 is also an enlarged fragmental section taken on the line 4—4 of Fig. 1.

Fig. 5 is a plan view of a simple memoranda device which incorporates an aligning device such as I have devised, but embodying a slightly different form thereof.

Fig. 6 is a side elevation of such an aligning device as I have shown in Fig. 5.

Figs. 7 and 8 are details of the simple form of the invention as shown in Figs. 5 and 6.

Figs. 9 and 10 are somewhat diagrammatic views showing the manner in which the elements shown in Figs. 7 and 8 function.

Figs. 11 and 12 are views showing in plan the respective positions and conditions of the superposed webs before and after the aligning operation.

Fig. 13 is an elevational view disclosing an exemplary loose leaf binder embodying a modified form of web aligning device embodying my invention.

Fig. 14 is a plan view of the binder and web aligning device shown in Fig. 13.

Fig. 15 is a fragmental perspective view of one element of the web aligning device shown in Figs. 13 and 14.

Figs. 16 and 17 are, respectively, collapsed and expanded somewhat diagrammatic views of another form of web aligning device embodying my invention.

Figs. 18 and 19 are, respectively, collapsed and expanded somewhat diagrammatic views of still another form of web aligning device embodying my invention.

I will first describe the invention as applied to Figs. 1 to 4 inclusive. Here I have a register frame 13 which carries a drive shaft 14 upon which a crank 15 is provided for rotation of the shaft. The shaft carries a gear 16 which meshes with a pinion 17 mounted upon a transverse shaft 18 located above shaft 14. The shaft 14 carries discs 19 which are notched, while shaft 18 carries smaller feeding discs 20 which rotate in contact with discs 19 tightly enough to grip the form-printed webs between them. This contact permits feeding of the webs forwardly at all such times except as when the notch of disc 19 is presented to roller 20. At this time the webs are released for aligning action upon them by the aligning device. Such, in general, constitutes a feeding device which may be employed with my improved aligning device, but to which I do not lay especial claim at this time.

As illustrative of embodiments of my invention, I have shown several forms thereof. The invention to which I lay especial claim is that of causing the alignment of two or more superposed webs by bringing a collapsible pin into engagement with the superposed apertures of the webs and then expanding such a pin to adjustable positions of the webs relatively to each other by bringing the apertures into absolute registration. Of course, it may be understood that the printed forms and the apertures of each web are identical and are identically spaced in each instance, so that registration of the apertures will cause registration of the printed forms.

In the form shown in Figs. 1 to 4 inclusive, the collapsible pin is embodied in two elements 21 and 22. The former element is hollow to permit of its movement relatively to the latter element and it may be conveniently provided with a forwardly hooked upper edge 23. The collapsed position of the pin elements is shown in Fig. 2, while the expanded position is shown in Figs. 1, 3 and 4. For the purpose of causing this relative movement, the element 21 is preferably the one with which the pin expansion is created. This may be done by making pin element 21 as a turned up lug on a reciprocally mounted plate 25 associated in sliding relation to a stationary plate 24 from which pin element 22 is formed. Normally the plate 25 may be held yieldingly in pin contracted position by a spring 26.

This position is changed to expanded condition by causing forward movement of the plate 25 against the tension of spring 26. In order to do this I have equipped shaft 14 with a cam 27 and plate 25 with a finger 28 cooperating therewith. With this mechanism, rotation of the cam releases the plate 25, and its pin element 21 moves to collapsed condition relatively to element 22.

The coordination of the discs 19 and cam 27 is such that during rotation of the discs, the cam 27 expands the pins, after the paper webs have been fed forward between the segmental discs 19 and rollers 20 and over the pins. At the time the feeding surfaces separate upon presentation of the notches to the rollers, the pins have reached their fully collapsed condition and the webs have been released from feeding movement, the apertures of the webs having permitted them to spring or drop over the pins. With the parts in this condition it is but necessary to rotate the crank until the cam engages the finger 28, thereby causing rapid expansion of the pins within the web apertures. Should there be any misalignment of the webs the positions of the superposed apertures will, by this action, be corrected and perfect alignment thus attained. Operation of the machine is stopped at this point. After such a web feeding and alignment, the projected portions 29 may be torn off over a tearing edge 30, while a knife 31 may be used to cut off others of the projected web portions within the register casing. It will be seen that the inclined face 23ª of pin element 21 extends upwardly from its rear to its front hooked edge 23. This formation is to enable the pin to be self stripping. By this I mean that when the pin has been placed in collapsed condition, the subsequent feeding movement of the paper webs will cause them to lift up and pass over the pins automatically without having previously been lifted therefrom.

In Figs. 5 to 12 inclusive, a somewhat different form of the invention is shown. In this form the device is simple because it is primarily intended for memoranda or similar purposes, in which it is desirable to have one or more copies of the memorandum made from the original simultaneously with its writing. A simple framework 32 provides rotatable support for a multiple wound roll of stationery 33 which may furnish the paper supply for the flat writing portion 34 of the device. A tearing knife 35 at the forward edge of the device, is provided to permit the used portions of the web to be torn off. This knife has holes 36 through it in registration with aligning pins extending through the holes. These pins are of the split type, in which the two half pins 38 and 39 are capable of being brought together and separated to secure alignment of the webs. The halves 38 of the pins are located on one bar 40 while the other halves 39 of the pins are located on another bar 41. These bars are normally separable under tension of springs 42 and 43 for bringing the web forms into registration, while they may be drawn together to permit the web apertures to be placed over them. At the ends of the bars 40 and 41 are the half trunnions 44 and 45 which govern the bringing together of the pin-bearing bars. To accomplish this bar movement, the tearing knife 35 is provided with arms 46 which are secured to a shaft 47 to which a lever 48 is secured for raising of the knife, springs 49 being provided for clamping the knife upon the webs. The arms 46 are slotted just beneath the knife to provide an enlarged upper slot end 50 and a constricted lower slot end 51.

When the knife is raised the trunnion halves 44 and 45 are drawn together thus bringing the aligning pins to collapsed condition. This permits the webs to be drawn out and placed with their apertures over the pins. Then the knife is lowered and in doing so the trunnion halves 44 and 45 are allowed to enter the wider portions 50 of the slots in the side arms 46. The springs 42 and 43 are then permitted to function in drawing the bars and consequently the pin halves 38 and 39 apart. This occurring within the aligning apertures of the webs causes movement of the misaligned webs from the condition shown in Fig. 11 to that shown in Fig. 12 in which perfect alignment has been established.

A feature has been shown in Fig. 3, to which I draw attention. This consists of a series of vanes, blades, slats or shutters 52, 53 and 54 over which the webs are drawn. These slats are mounted pivotally between the sides of the register so that they may rest upon the webs and exert friction upon the webs as they are drawn from the source of supply, thus holding them more tautly upon the register platen and thereby avoiding wrinkles and air pockets between the webs by the application of tension. Of course in the making of copies the usual interleaved carbon paper 55 is used for this purpose, and it is equally obvious that other means than that of the specific slats disclosed may be employed to perform the same function.

Although I have described my invention as applied to a device of the nature of an autographic register, I intend that it be understood that its application may as readily be made to any other device, whether for the making or filing of printed, hand written, type written or other notations, as exemplified in Figs. 13, 14 and 15. In these views I have shown a simple form of loose leaf binder for the filing of data sheets and which consists of a bottom 57 and a top 58, with suitable posts 59 for mounting the filed data sheets and for securing the bottom and top of the binder.

Each of the posts 59 consists of three elements comprising two substantially semi-circular elements 60 and 61 with which an expanding element 62 cooperates. The three elements constitute the expanding pin or post construction which, generally speaking, incorporates the inventive thought I have disclosed in previously described forms of my invention. The semi-circular or half-hollow elements 60 and 61 are provided with flanges 63 and 64 respectively which are mounted in grooves, slots or recesses in the bottom 57 of the binder, so that they may be moved therein to permit these elements to be brought together or separated. When element 62 has been removed from between elements 60 and 61, the filing pin may be said to be in collapsed condition so that cover 58 may be removed therefrom and data sheets added to or removed from the sheets in the binder. Of course, when such apertured sheets are placed over the collapsed pin, they will be out of alignment so that their apertures do not register exactly. However, when binder top 58 has been placed upon the accumulated data sheets, and pin element 62 has been forced to its position between elements 60 and 61, the latter elements are caused to move apart, thereby shifting the misaligned data sheets to aligned condition by causing their apertures to become registered in superposed relation with each other. In addition to such an expanding operation, the pin elements 60 and 61 become locked in the holes of the cover of the binder, thereby locking the binder and the sheets firmly together.

Fig. 15 shows a detail of either element 60 or 61, disclosing the semi-circular recess 65 in each for occupancy by expanding element 62. This view also shows a flared termination 66 to recess 65 so as to enable element 62 to be passed more readily between elements 60 and 61.

Figs. 16 and 17, disclosing, respectively collapsed and expanded views of another form of my invention, somewhat diagrammatically, show a pin comprising two semi-circular shells 67 and 68 between which a rotatable expanding key 69 is located for movement to the respective positions shown for purposes of aligning apertured webs which have been placed over them.

In Figs. 18 and 19, I have shown another simple modification of my invention, consisting of two pin halves 70 and 71 which are moved to separated condition by an expanding wedge 72, as shown in Fig. 19, from the collapsed condition shown in Fig. 18.

Having thus described my invention, what I claim is:

1. An alignment device for a series of apertured webs, consisting of a pin composed of elements adapted for movement toward and away from one another within the apertures of the webs, and means for causing said movement.

2. An alignment device for a series of webs having apertures therein, consisting of an expandable pin, adapted, when in contracted condition, to occupy the apertures of the webs, and when moved to expanded condition to cause said occupied apertures to become aligned, and means to expand and contract the pin.

3. An alignment device for a series of apertured webs, consisting of a pin composed of two elements, one of said elements having movement relatively to the other within the web apertures, and means for causing said movement.

4. An alignment device for a series of strips provided with register perforations comprising: pin elements mounted for movement toward and away from each other within said perforations, one of said pin elements having guide means for directing the strips away from a companion pin element when in collapsed position; and means for moving one of said pin elements relative to the other.

JOHN E. EUTH.

DISCLAIMER 1,988,195.—*John E. Euth*, Cincinnati, Ohio. WEB ALIGNING DEVICE. Patent dated January 15, 1935. Disclaimer filed March 9, 1935, by the assignee, *United Autographic Register Co.*

Hereby disclaims from the scope of the claims all constructions excepting those in which the pin-elements are supported at one end and present a free end adapted to enter the web-apertures.

[*Official Gazette April 2, 1935.*]